United States Patent
Masuda et al.

(10) Patent No.: US 11,889,238 B2
(45) Date of Patent: Jan. 30, 2024

(54) PROJECTION APPARATUS, PROJECTION METHOD, AND CONTROL PROGRAM

(71) Applicant: FUJIFILM Corporation, Tokyo (JP)

(72) Inventors: Tomonori Masuda, Saitama (JP); Akihiro Ishizuka, Saitama (JP); Kazuki Inoue, Saitama (JP); Kazuki Ishida, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/831,516

(22) Filed: Jun. 3, 2022

(65) Prior Publication Data

US 2022/0295028 A1    Sep. 15, 2022

Related U.S. Application Data

(63) Continuation of application No. PCT/JP2020/045519, filed on Dec. 7, 2020.

(30) Foreign Application Priority Data

Dec. 27, 2019    (JP) .................................. 2019-237977

(51) Int. Cl.
  *H04N 9/31* (2006.01)
  *G09G 3/00* (2006.01)
(52) U.S. Cl.
  CPC ........... *H04N 9/3188* (2013.01); *G09G 3/002* (2013.01); *H04N 9/3185* (2013.01); *G09G 2340/045* (2013.01)

(58) Field of Classification Search
  CPC ...... G03B 21/00; G03B 21/14; G03B 21/142; G03B 21/147; H04N 9/3185;
  (Continued)

(56) References Cited

U.S. PATENT DOCUMENTS

2006/0197920 A1    9/2006  Furui et al.
2008/0292304 A1    11/2008 Hirai
(Continued)

FOREIGN PATENT DOCUMENTS

JP    2000-81601 A    3/2000
JP    2005-234071 A    9/2005
(Continued)

OTHER PUBLICATIONS

International Preliminary Report on Patentability (Form PCT/IPEA/409) for International Application No. PCT/JP2020/045519, dated Oct. 7, 2021, with English translation.
(Continued)

*Primary Examiner* — Sultan Chowdhury
(74) *Attorney, Agent, or Firm* — Birch, Stewart, Kolasch & Birch, LLP

(57) ABSTRACT

A projection apparatus includes: a projection portion; and a processor, and the processor is configured to: cause a user to select, among end parts of a projection region irradiated with projection light by the projection portion, a part of an end part of the projection region; and in a state where a position of the part of the end part is sensed as being a first position, maintain the position of the part of the end part and execute, by a control of changing an optical system of the projection portion, a control of performing enlargement or reduction of the projection region.

15 Claims, 12 Drawing Sheets

(58) Field of Classification Search
CPC .. H04N 9/3188; H04N 9/3191; H04N 9/3194; H04N 9/3197; G09G 3/00; G09G 3/001; G09G 3/002; G09G 3/003; G09G 2340/045; G09G 2340/0457; G09G 2340/0428
See application file for complete search history.

(56) References Cited

U.S. PATENT DOCUMENTS

| | | | |
|---|---|---|---|
| 2009/0278999 | A1 | 11/2009 | Ofune et al. |
| 2011/0242421 | A1 | 10/2011 | Park et al. |
| 2012/0026070 | A1* | 2/2012 | Ozaki ............... H04N 9/3147 345/1.3 |
| 2014/0085192 | A1* | 3/2014 | Posa .................. G09G 3/001 345/156 |
| 2014/0111536 | A1 | 4/2014 | Shinozaki |
| 2016/0044289 | A1 | 2/2016 | Matsuno |
| 2019/0037186 | A1* | 1/2019 | Yoshimura ....... H04N 21/42204 |

FOREIGN PATENT DOCUMENTS

| | | |
|---|---|---|
| JP | 2006-246306 A | 9/2006 |
| JP | 2007-272068 A | 10/2007 |
| JP | 2008-294545 A | 12/2008 |
| JP | 2009-273015 A | 11/2009 |
| JP | 2010-20036 A | 1/2010 |
| JP | 2011-248271 A | 12/2011 |
| JP | 2013-37082 A | 2/2013 |
| JP | 2014-86788 A | 5/2014 |
| JP | 2016-38566 A | 3/2016 |
| JP | 2018-54912 A | 4/2018 |

OTHER PUBLICATIONS

International Search Report (Form PCT/ISA/210) for International Application No. PCT/JP2020/045519, dated Feb. 22, 2021, with English translation.

* cited by examiner

PROJECTION APPARATUS, PROJECTION METHOD, AND CONTROL PROGRAM

CROSS REFERENCE TO RELATED APPLICATION

This is a continuation of International Application No. PCT/JP2020/045519 filed on Dec. 7, 2020, and claims priority from Japanese Patent Application No. 2019-237977 filed on Dec. 27, 2019, the entire disclosures of which are incorporated herein by reference.

BACKGROUND OF THE INVENTION

1. Field of the Invention

The present invention relates to a projection apparatus, a projection method, and a computer readable medium storing a control program.

2. Description of the Related Art

In the related art, projectors that display an image by projecting the image to a projection object such as a large screen have been known. Such projectors include a projector that can adjust a position or a size of a projection image with respect to the projection object by changing an optical system or the like of a projection lens to perform enlargement or reduction of the projection image.

For example, JP2005-234071A discloses a projector that performs auto zooming of fully displaying an image pattern in a display region of a screen using sensor data obtained by a line sensor. In addition, JP2007-272068A discloses a projector that adjusts the entire projection region to fall within a screen by decreasing a zoom angle to narrow the projection region without changing a projection optical axis center position of a projection lens.

SUMMARY OF THE INVENTION

One embodiment according to the disclosed technology provides a projection apparatus, a projection method, and a computer readable medium storing a control program that enable adjustment of a projection region with respect to a projection object to be easily performed.

A projection apparatus according to an aspect of the present invention comprises a projection portion, and a processor, in which the processor is configured to, in a state where a position of a part of an end part of a projection region irradiated with projection light by the projection portion is sensed as being a first position, maintain a position of the part of the end part and execute a control of performing enlargement or reduction of the projection region.

A projection method according to another aspect of the present invention is a projection method by a projection apparatus including a projection portion, the projection method comprising, in a state where a position of a part of an end part of a projection region irradiated with projection light by the projection portion is sensed as being a first position, maintaining the position of the part of the end part and performing enlargement or reduction of the projection region.

A control program according to still another aspect of the present invention is a control program of a projection apparatus including a projection portion, the control program causing a computer to execute a process comprising, in a state where a position of a part of an end part of a projection region irradiated with projection light by the projection portion is sensed as being a first position, maintaining the position of the part of the end part and performing enlargement or reduction of the projection region.

According to the present invention, a projection apparatus, a projection method, and a control program that enable adjustment of a projection region with respect to a projection object to be easily performed can be provided.

DESCRIPTION OF THE PREFERRED EMBODIMENTS

Hereinafter, an embodiment of the present invention will be described with reference to the drawings.

Embodiment

Figure 1:
FIG. 1 is a schematic diagram illustrating a schematic configuration of a projection apparatus 10 that is an embodiment of a projection apparatus according to an embodiment of the present invention.
Figure 1:
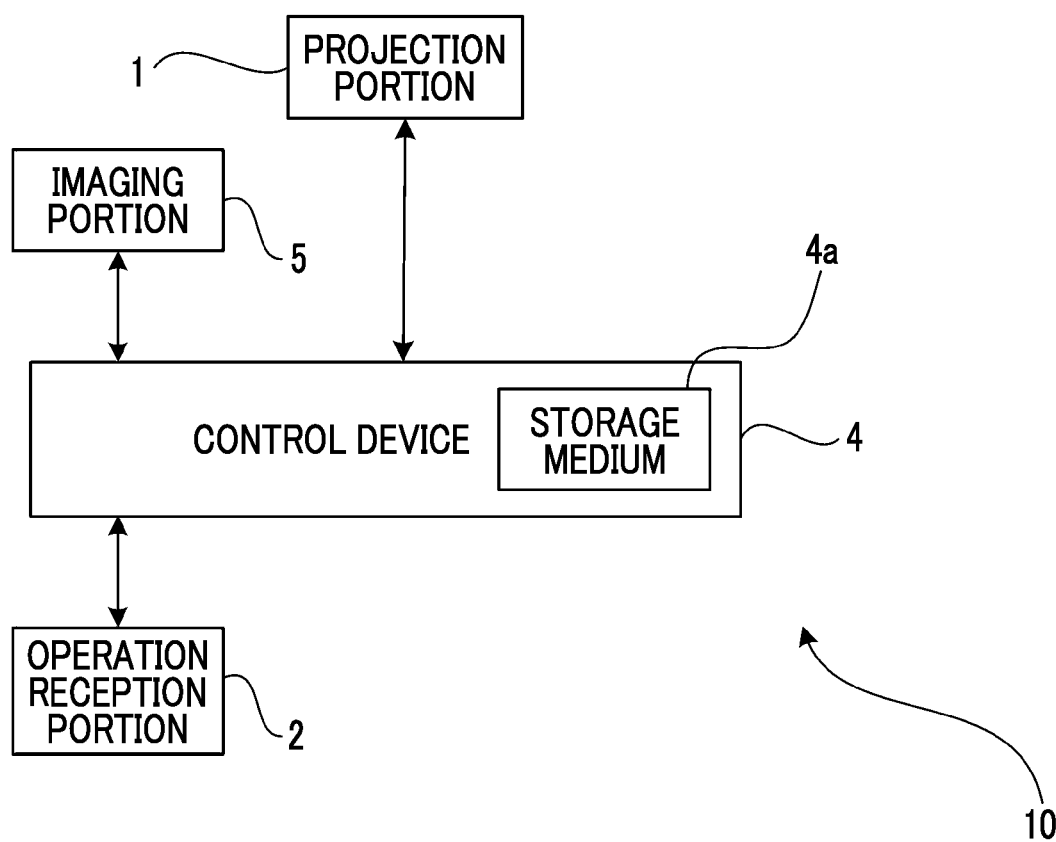

FIG. 1 is a schematic diagram illustrating a schematic configuration of a projection apparatus 10 that is an embodiment of a projection apparatus according to the embodiment of the present invention.

The projection apparatus 10 comprises a projection portion 1, a control device 4, an imaging portion 5, a screen 6, and an operation reception portion 2. The projection portion 1 is configured with, for example, a liquid crystal projector or a projector using liquid crystal on silicon (LCOS). Hereinafter, the projection portion 1 will be described as a liquid crystal projector.

The control device 4 is a device including a control portion configured with various processors, a communication interface (not illustrated) for communicating with each portion, and a storage medium 4a such as a hard disk, a solid state drive (SSD), or a read only memory (ROM) and generally controls the projection portion 1 and the imaging portion 5.

Examples of the various processors of the control portion of the control device 4 include a central processing unit (CPU) that is a general-purpose processor performing various processing by executing a program, a programmable logic device (PLD) such as a field programmable gate array (FPGA) that is a processor having a circuit configuration changeable after manufacturing, or a dedicated electric circuit such as an application specific integrated circuit (ASIC) that is a processor having a circuit configuration dedicatedly designed to execute specific processing.

More specifically, a structure of these various processors is an electric circuit in which circuit elements such as semiconductor elements are combined. The control portion of the control device 4 may be configured with one of the various processors or may be configured with a combination of two or more processors of the same type or different types (for example, a combination of a plurality of FPGAs or a combination of a CPU and an FPGA).

The imaging portion 5 comprises an imaging element such as a charged coupled device (CCD) image sensor or a metal oxide semiconductor (MOS) image sensor that images a subject through an imaging optical system, and images the screen 6. A captured image captured by the imaging portion 5 is input into the control device 4.

The operation reception portion 2 detects an instruction (user instruction) from a user by receiving various operations from the user. The operation reception portion 2 may be a button or the like provided in the control device 4 or a reception portion or the like that receives a signal from a remote controller for remotely operating the control device 4.

The screen 6 is a projection object having a projection surface on which a projection image is displayed by the projection portion 1. In the example illustrated in FIG. 1, the projection surface of the screen 6 is rectangular. It is assumed that upper, lower, left, and right sides of the screen 6 in FIG. 1 are upper, lower, left, and right sides of the actual screen 6.

In the projection apparatus 10, while the imaging portion 5 is independently provided, the imaging portion 5 may be incorporated in the projection portion 1. In addition, the imaging portion 5 may be omitted in the projection apparatus 10.

Figure 2:
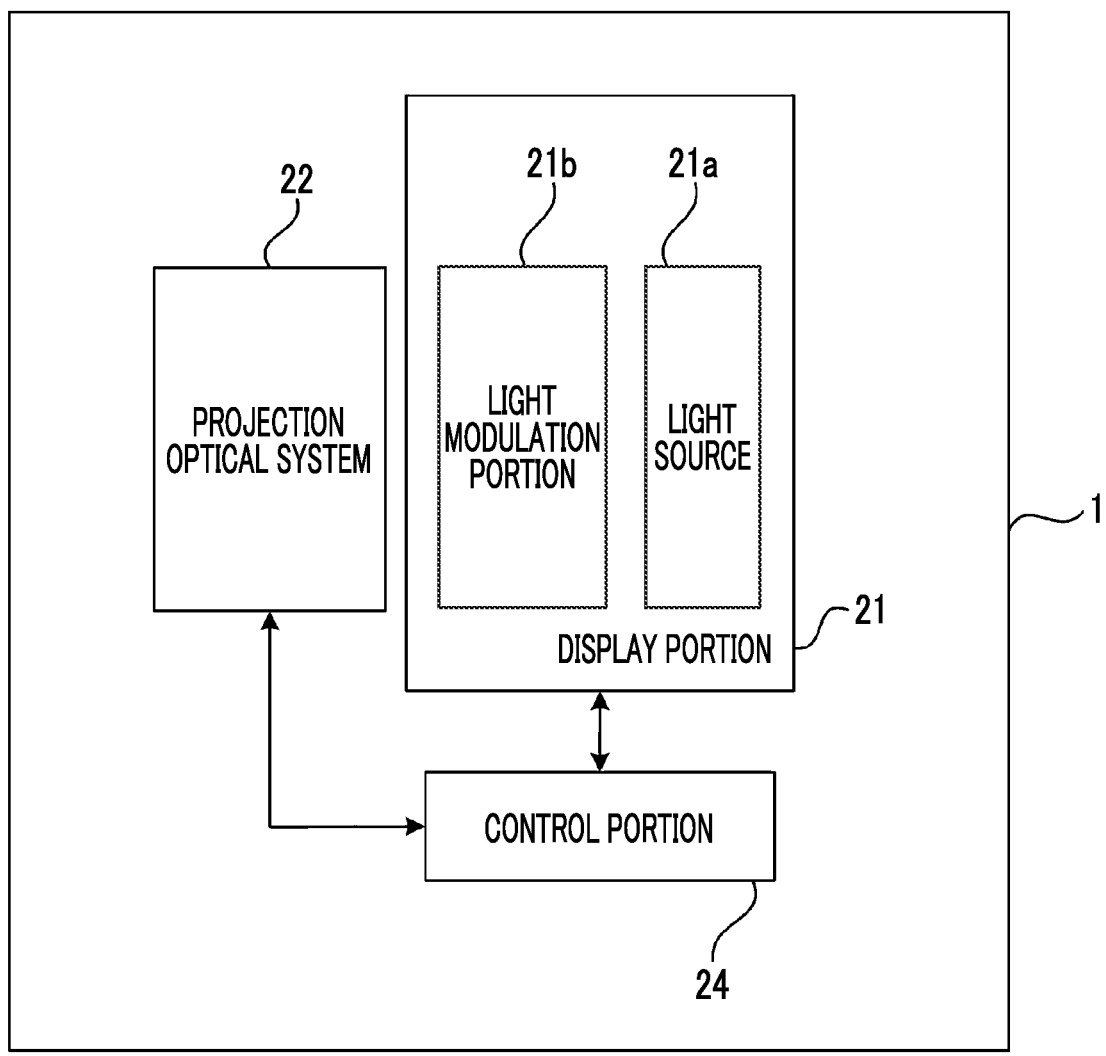
FIG. 2 is a schematic diagram illustrating an example of an internal configuration of a projection portion 1 illustrated in FIG. 1.

FIG. 2 is a schematic diagram illustrating an example of an internal configuration of the projection portion 1 illustrated in FIG. 1.

As illustrated in FIG. 2, the projection portion 1 comprises a display portion 21 including a light source 21a and a light modulation portion 21b, a projection optical system 22, and a control portion 24.

The light source 21a includes a light emitting element such as a laser or a light emitting diode (LED) and emits, for example, white light.

The light modulation portion 21b is configured with three liquid crystal panels that emit each color image by modulating, based on image information, each color light which is emitted from the light source 21a and is separated into three colors of red, blue, and green by a color separation mechanism, not illustrated. Filters of red, blue, and green may be mounted in each of the three liquid crystal panels, and each color image may be emitted by modulating the white light emitted from the light source 21a in each liquid crystal panel.

The light from the display portion 21 is incident on the projection optical system 22. The projection optical system 22 includes at least one lens and is configured with, for example, a relay optical system. The light that has passed through the projection optical system 22 is projected to the screen 6.

The control portion 24 projects an image based on display data to the screen 6 by controlling the display portion 21 based on the display data input from the control device 4. The display data input into the control portion 24 is configured with three constituents of red display data, blue display data, and green display data.

In addition, the control portion 24 performs enlargement or reduction of a projection region 11 (refer to FIG. 3) of the projection portion 1 by changing the projection optical system 22 based on an operation received by the operation reception portion 2 from the user. In addition, the control portion 24 may perform movement of the projection region 11 of the projection portion 1 by changing the projection optical system 22 based on the operation received by the operation reception portion 2 from the user.

In addition, the projection apparatus 10 may comprise an adjustment portion that mechanically or optically adjusts a position of the projection region 11. For example, this adjustment portion is implemented by a shift mechanism or an imaging direction changing mechanism.

The shift mechanism is, for example, a shift mechanism (for example, refer to FIG. 10 and FIG. 11) that performs mechanical shifting of moving the projection optical system 22 in a direction perpendicular to an optical axis, or a shift mechanism that performs optical shifting of moving the light modulation portion 21b in the direction perpendicular to the optical axis instead of moving the projection optical system 22. In addition, the shift mechanism may perform the mechanical shifting and the optical shifting in combination.

Figure 10:
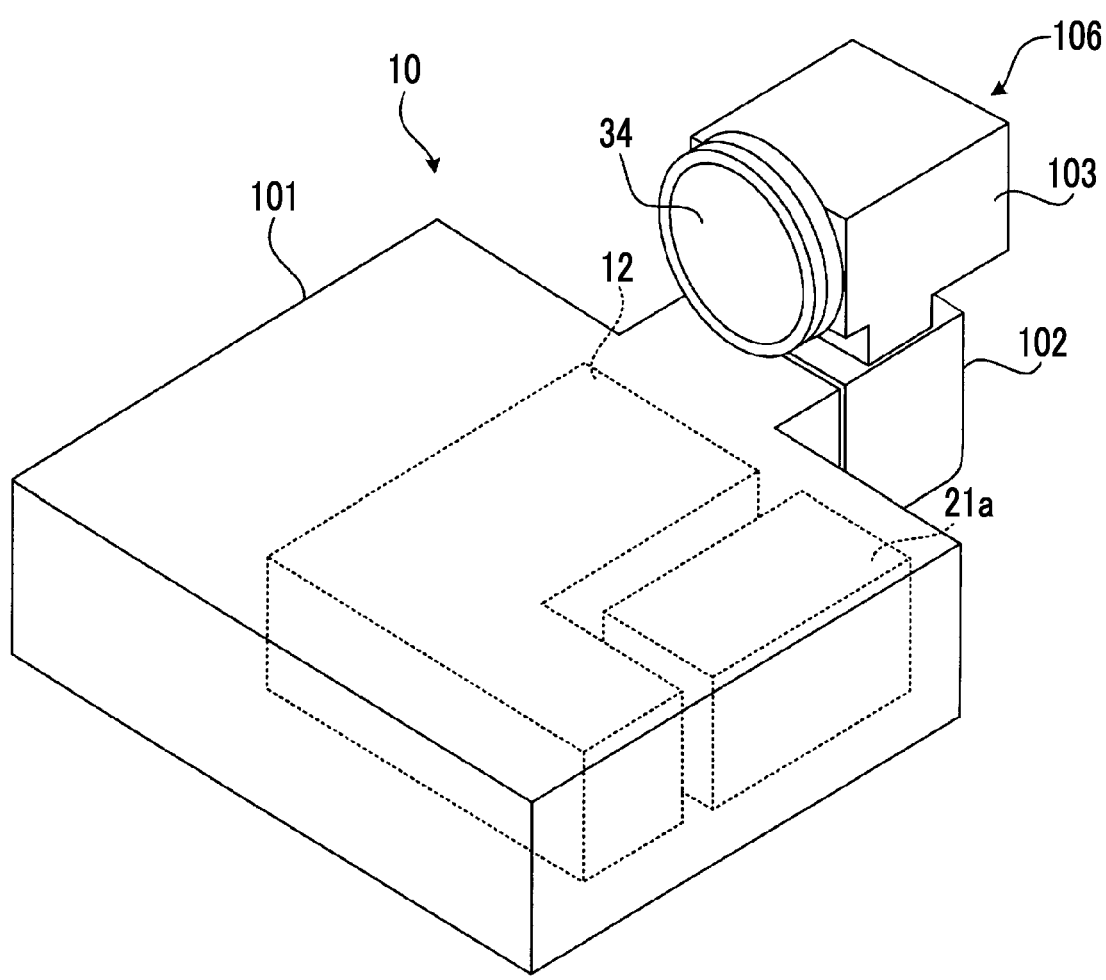
FIG. 10 is a schematic diagram illustrating an exterior configuration of the projection apparatus 10.
Figure 11:
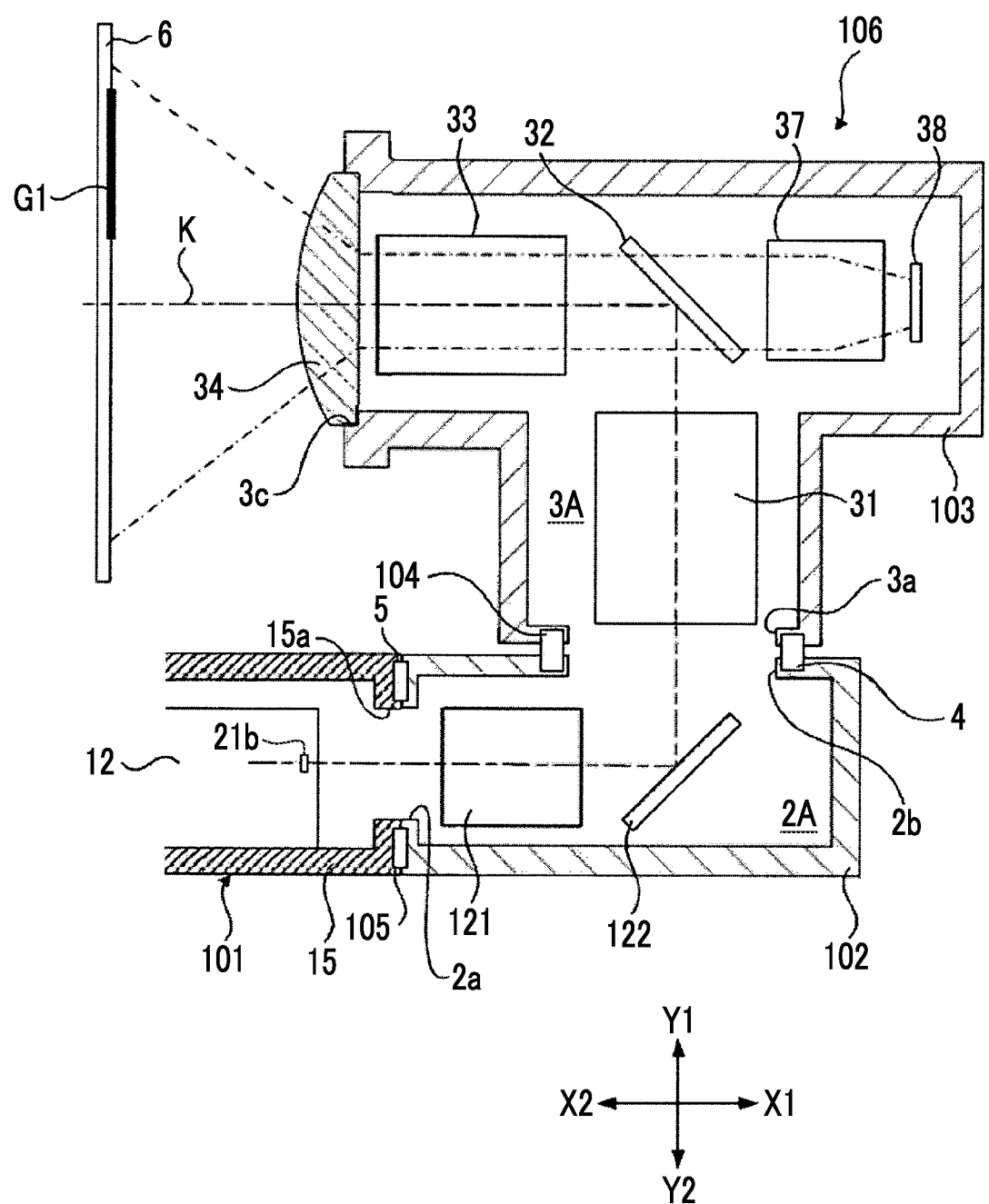
FIG. 11 is a schematic cross-sectional view of an optical unit 106 of the projection apparatus 10 illustrated in FIG. 10.

The imaging direction changing mechanism is a mechanism that can change a projection direction of the projection portion 1 by changing a direction of the projection portion 1 by mechanical rotation (for example, refer to FIG. 10 and FIG. 11).

Figure 3:
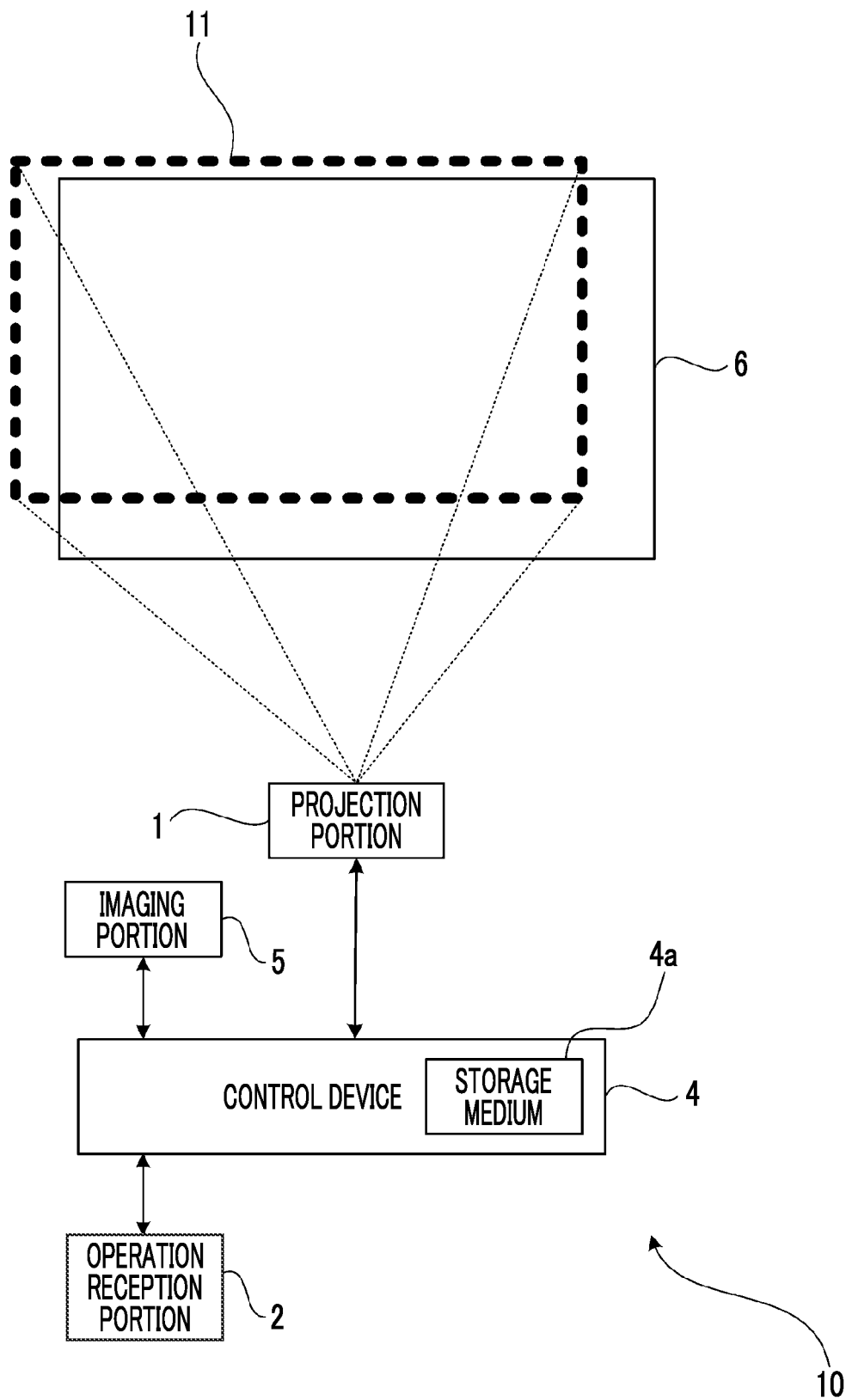
FIG. 3 is a diagram illustrating an example of a state of a projection region 11 before adjustment of the projection portion 1.

FIG. 3 is a diagram illustrating an example of a state of the projection region 11 before adjustment of the projection portion 1.

The projection region 11 illustrated in FIG. 3 is a range irradiated with projection light by the projection portion 1. In the example illustrated in FIG. 3, the projection region 11 is rectangular. In the state illustrated in FIG. 3, the projection region 11 is different from the screen 6 in position and size. Here, a case of adjusting the projection region 11 such that the projection image is fully displayed on the screen 6, that is, a periphery of the projection region 11 matches a periphery of the screen 6, will be described.

Figure 4:
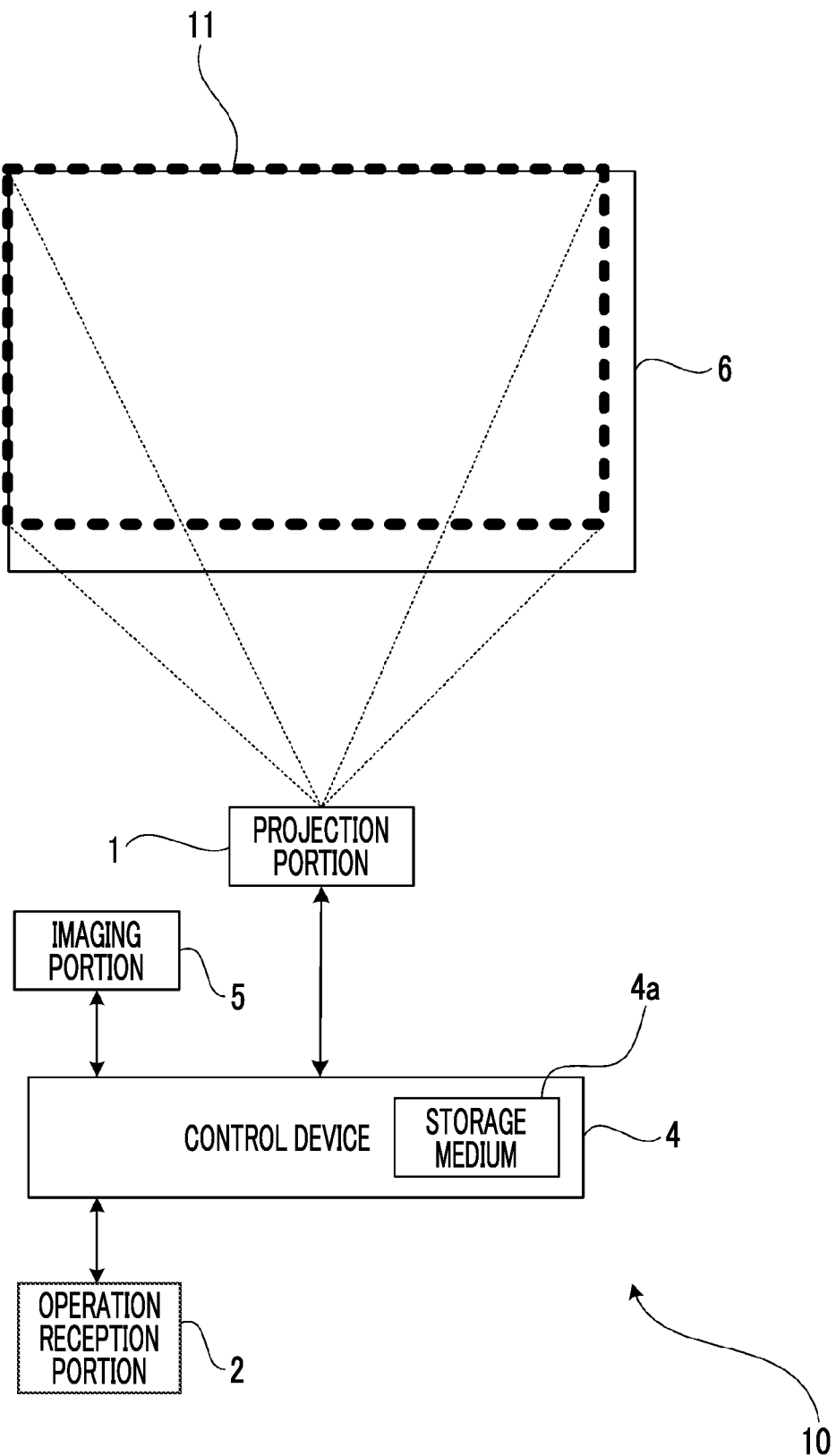
FIG. 4 is a diagram illustrating a first state of the projection region 11 during the adjustment of the projection portion 1.

FIG. 4 is a diagram illustrating a first state of the projection region 11 during the adjustment of the projection portion 1.

After the state illustrated in FIG. 3, the user adjusts the projection region 11 such that one corner (angle) of the rectangular projection region 11 matches one corner of the screen 6 as illustrated in FIG. 4. One corner of the projection region 11 constitutes a part of an end part of the projection region 11.

This adjustment may be performed by changing a position and the direction of the projection portion 1 or may be performed by changing the projection optical system 22 (refer to FIG. 3). This adjustment may be performed by considering one corner and thus, can be easily performed.

In the example illustrated in FIG. 4, the projection region 11 is adjusted such that an upper left corner of the projection region 11 matches an upper left corner of the screen 6. In this case, positions of the upper left corners of the projection region 11 and the screen 6 constitute a first position at which a position of the part of the end part of the projection region 11 irradiated with the projection light by the projection portion 1 matches a specific position (upper left corner) of the screen 6.

Figure 5:
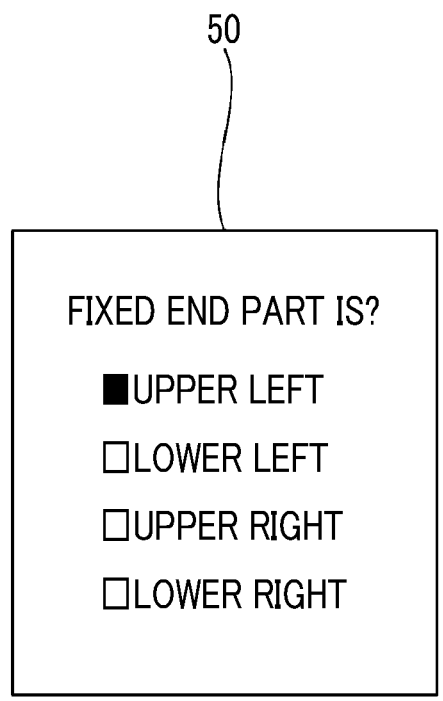
FIG. 5 is a diagram illustrating an example of a selection screen of a first fixed end part.

FIG. 5 is a diagram illustrating an example of a selection screen of a first fixed end part.

In the state illustrated in FIG. 4, for example, the control device 4 displays a selection screen 50 illustrated in FIG. 5 to the user. For example, the display of the selection screen 50 is performed by a display, not illustrated, comprised in the projection apparatus 10 or by projection to the screen 6 using the projection portion 1.

The selection screen 50 shows four corners of upper left, lower left, upper right, and lower right corners as candidates of the first fixed end part. A corner marked with ■ indicates a temporarily selected corner, and a corner marked with □ indicates a corner that is not temporarily selected.

In a case where a selection switching operation is received from the user, the control device 4 changes the temporarily selected corner among the four corners. In addition, in a case where a decision operation is received from the user, the control device 4 confirms the temporarily selected corner among the four corners as the first fixed end part.

These operations may be performed by an operating part such as the button provided in the control device 4 or the remote controller or the like for remotely operating the control device 4, or using other methods.

In the example illustrated in FIG. 4, the projection region 11 is adjusted such that the upper left corner of the projection region 11 matches the upper left corner of the screen 6. Thus, the user selects the upper left corner in the selection screen 50 as illustrated in FIG. 5. Accordingly, the control device 4 can sense the upper left corner of the projection region 11 as a fixed end part (first position).

Figure 6:
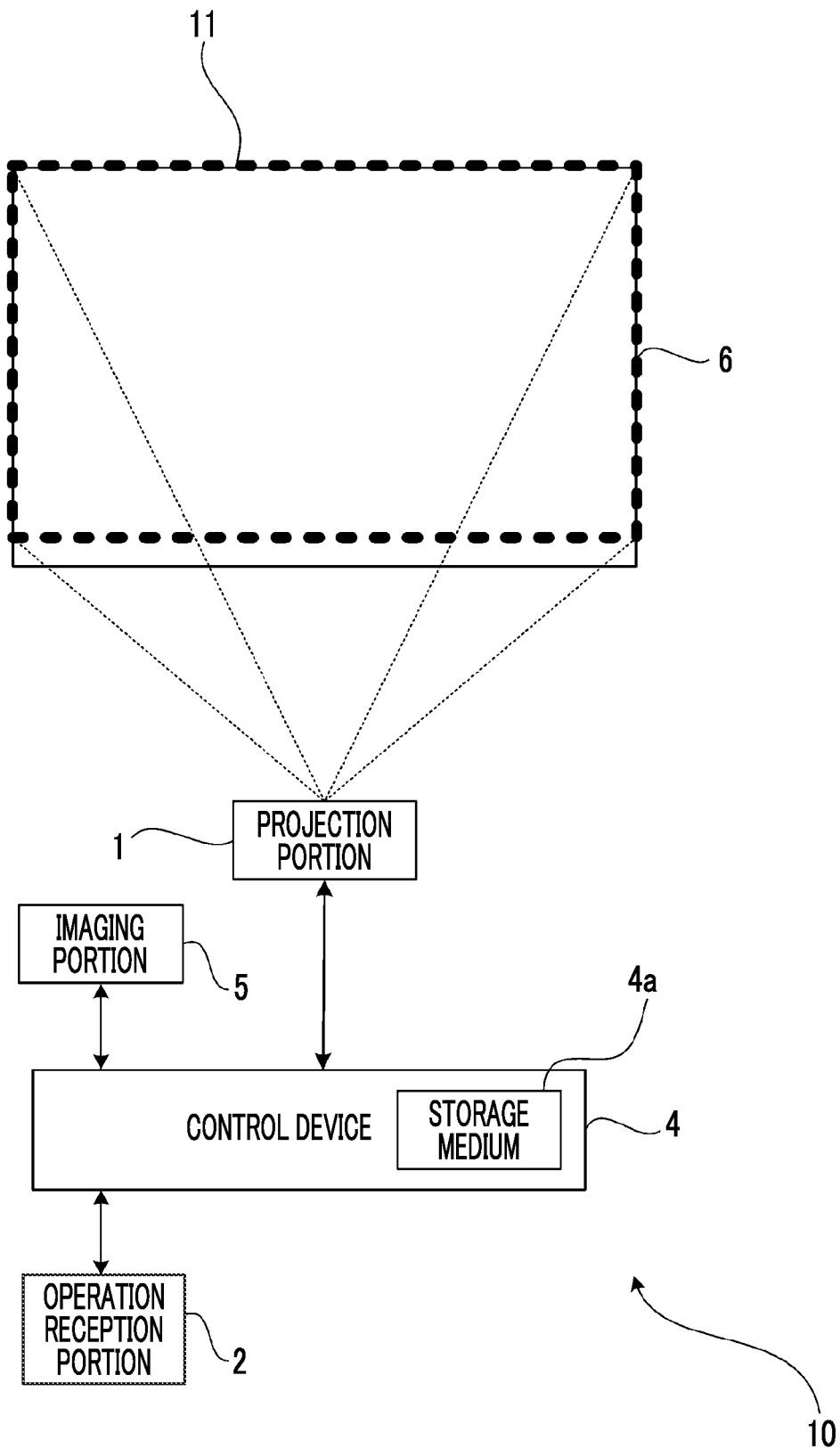
FIG. 6 is a diagram illustrating a second state of the projection region 11 during the adjustment of the projection portion 1.

FIG. 6 is a diagram illustrating a second state of the projection region 11 during the adjustment of the projection portion 1.

After the fixed end part is sensed as illustrated in FIG. 5, in a case where an enlargement or reduction operation is received from the user, the control device 4 maintains a position of the sensed fixed end part and performs the enlargement or reduction of the projection region 11 corresponding to the received enlargement or reduction operation. In the example illustrated in FIG. 5, since the upper left corner is sensed as the fixed end part, the control device 4 maintains a position of the upper left corner of the projection region 11 and performs the enlargement or reduction of the projection region 11.

For example, the maintaining of the fixed end part and the enlargement or reduction of the projection region 11 are implemented by performing the enlargement or reduction based on a center of the projection region 11 and performing the movement of the projection region 11 such that the position of the fixed end part changed by the enlargement or reduction is matched to the original position (first position) of the fixed end part. Alternatively, the maintaining of the fixed end part and the enlargement or reduction of the projection region 11 may be implemented by performing the enlargement or reduction and the movement at the same time.

In the example illustrated in FIG. 6, the control device 4 performs the enlargement of the projection region 11 such that the lower right corner of the projection region 11 moves in a lower right direction of the projection region 11. For example, the control device 4 performs the enlargement of the projection region 11 to four sides from the center of the projection region 11 illustrated in FIG. 4 and moves the projection region 11 in the lower right direction such that the position of the upper left corner of the projection region 11 changed in an upper left direction by the enlargement returns to the position before the enlargement. Alternatively, the control device 4 may perform the enlargement and the movement in the opposite order or may perform the enlargement and the movement at the same time.

As described, by maintaining the fixed end part and performing the enlargement or reduction of the projection region 11, the user may perform the enlargement or reduction operation such that the end part of the projection region 11 other than the fixed end part matches the end part of the screen 6. Thus, for example, the adjustment of the projection region 11 can be easily performed compared to enlargement or reduction by moving all of the four corners of the projection region 11.

For example, the enlargement or reduction of the projection region 11 by setting one corner as the fixed end part is performed while an aspect ratio of the projection region 11 is maintained. In this case, in a case where the projection region 11 and the screen 6 have different aspect ratios, only one of the upper right corner and the lower left corner of the projection region 11 can be matched to the end part of the screen 6.

In the example illustrated in FIG. 6, while the upper right corner of the projection region 11 matches the end part of the screen 6, the lower left corner of the projection region 11 does not match the end part of the screen 6. At this point in time, a state where each of the upper left and upper right corners of the projection region 11 matches the end part of the screen 6 is set.

Figure 7:
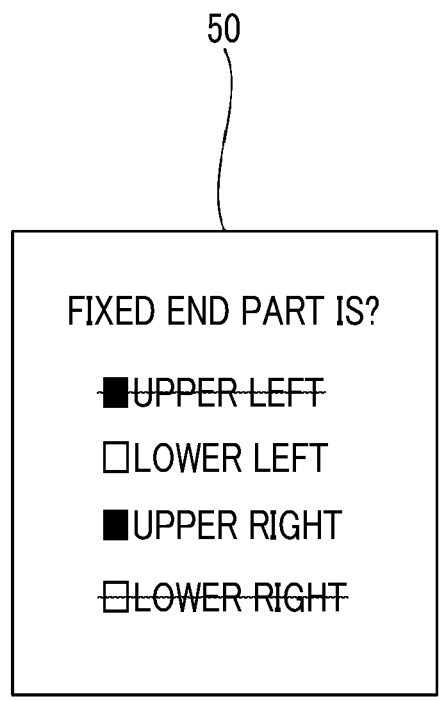
FIG. 7 is a diagram illustrating an example of the selection screen of a second fixed end part.

FIG. 7 is a diagram illustrating an example of the selection screen of a second fixed end part.

In the state illustrated in FIG. 6, for example, the control device 4 displays the selection screen 50 illustrated in FIG. 7. Here, since the upper left corner has already been selected as the first fixed end part, each of the lower left and upper right corners that are corners adjacent to the upper left corner is selectable as candidates of the second fixed end part, and each of the upper left and lower right corners is not selectable in the selection screen 50.

Since the upper left corner of the projection region 11 and the upper right corner of the projection region 11 match the end part of the screen 6, the user selects the upper right corner as the second fixed end part in the selection screen 50 as illustrated in FIG. 7. Accordingly, the control device 4 can sense the upper right corner of the projection region 11 as the second fixed end part (second position).

Figure 8:
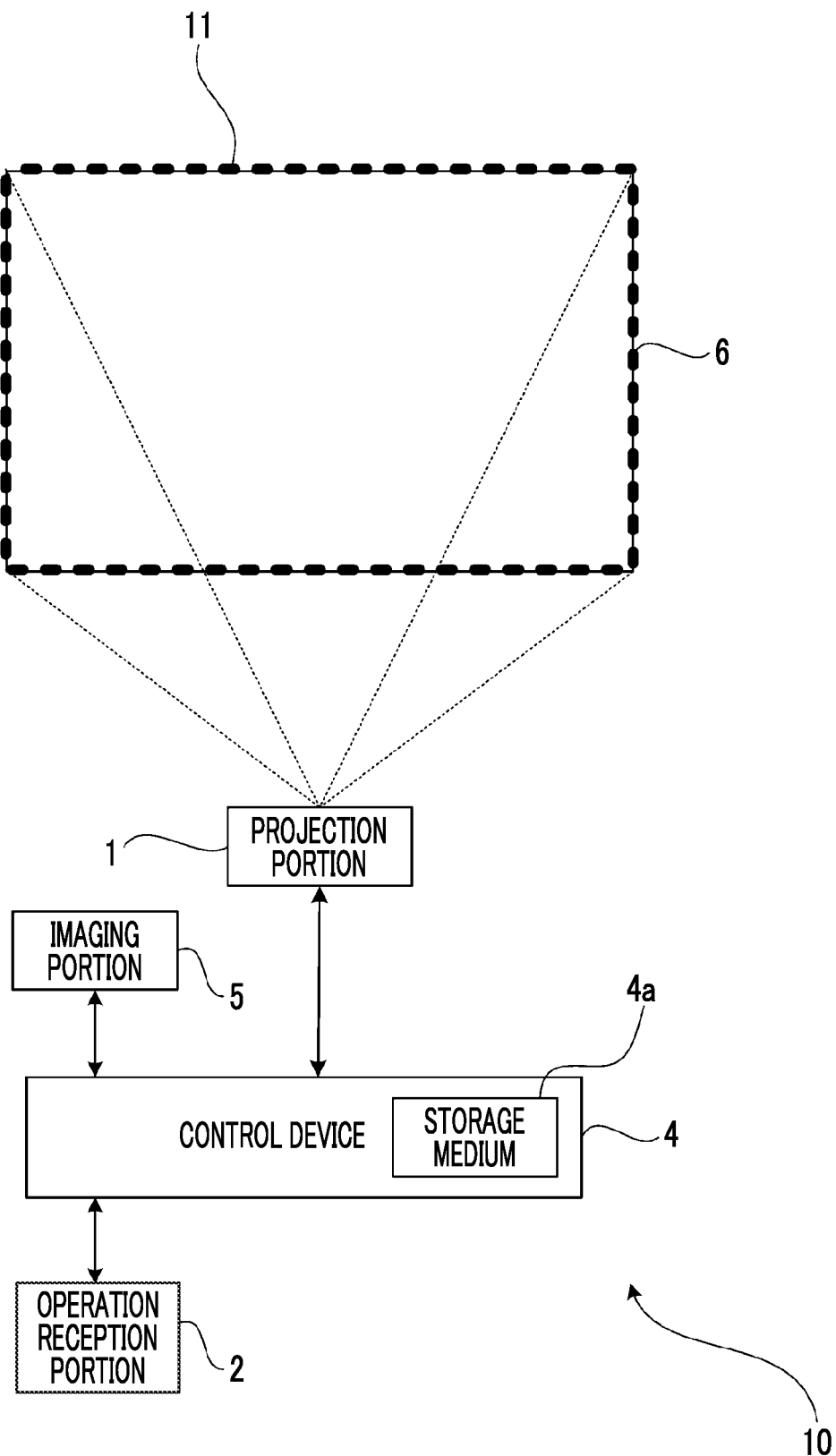
FIG. 8 is a diagram illustrating a third state of the projection region 11 during the adjustment of the projection portion 1.

FIG. 8 is a diagram illustrating a third state of the projection region 11 during the adjustment of the projection portion 1.

After the second fixed end part is sensed as illustrated in FIG. 7, in a case where the enlargement or reduction operation is received from the user, the control device 4 performs the enlargement or reduction of the projection region 11 corresponding to the received enlargement or reduction operation while maintaining a position of the sensed second fixed end part. In the example illustrated in FIG. 7, since each of the upper left and upper right corners is sensed as the fixed end part, the control device 4 maintains each of the upper left and upper right corners of the projection region 11 and performs the enlargement or reduction of the projection region 11.

This enlargement or reduction accompanies a change in aspect ratio of the projection region 11. Thus, for example, the control device 4 performs optical enlargement or reduction of the projection region 11 by changing the projection optical system 22 and electronic enlargement or reduction of the projection region 11 by controlling the light modulation portion 21b in combination.

In the example illustrated in FIG. 8, the control device 4 performs the enlargement of the projection region 11 such that the lower side of the projection region 11 moves in a downward direction of the projection region 11. For example, the control device 4 performs the enlargement of the projection region 11 to the four sides from the center of the projection region 11 illustrated in FIG. 6 and moves the projection region 11 in the lower right direction such that the position of the upper left corner of the projection region 11 changed in the upper left direction by the enlargement returns to the position before the enlargement. Alternatively, the control device 4 may perform the enlargement and the movement in the opposite order or may perform the enlargement and the movement at the same time.

Furthermore, at the time of the enlargement of the projection region 11, the control device 4 performs a control of maintaining a position of the right side of the projection region 11 by controlling the light modulation portion 21b to electronically change the aspect ratio of the projection region 11. Accordingly, the enlargement of the projection region 11 can be performed such that only the lower side of the projection region 11 moves.

The user can match the periphery of the projection region 11 to the periphery of the screen 6 as illustrated in FIG. 8 by performing the enlargement operation of the projection region 11 until the lower side of the projection region 11 matches the end part of the screen 6.

As described, by maintaining the fixed end part and performing the enlargement or reduction of the projection region 11, the user may perform the enlargement or reduction operation such that the end part (for example, the lower side) of the projection region 11 other than the fixed end part (for example, the upper left and upper right corners) matches the end part of the screen 6. Thus, for example, the adjustment of the projection region 11 can be easily performed compared to enlargement or reduction by moving all of the four corners of the projection region 11.

Figure 9:
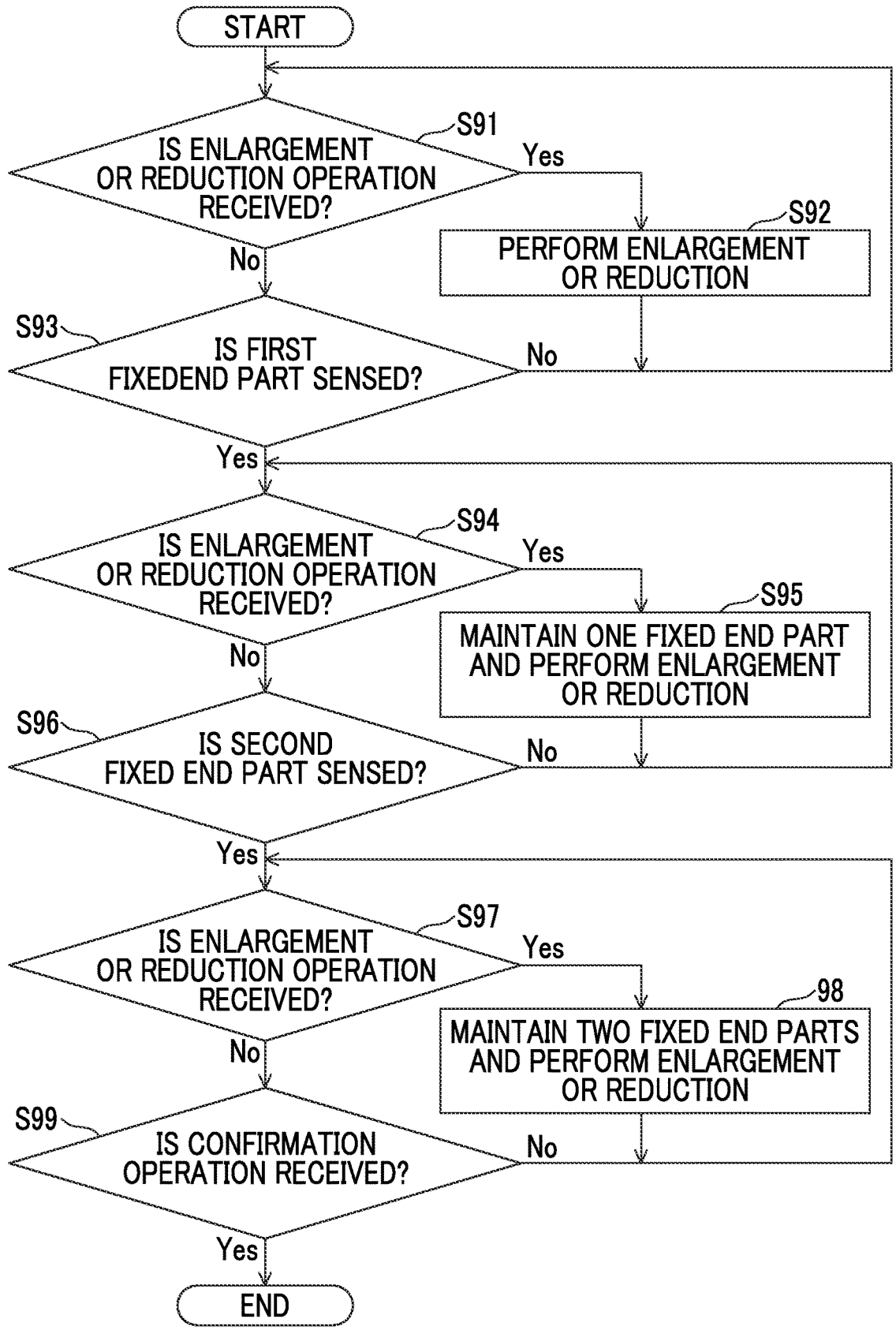
FIG. 9 is a flowchart illustrating an example of processing performed by a control device 4.

FIG. 9 is a flowchart illustrating an example of processing performed by the control device 4.

In a case where the adjustment of the projection region 11 with respect to the screen 6 is performed, for example, the control device 4 executes the processing illustrated in FIG. 9. First, the control device 4 determines whether or not the enlargement or reduction operation is received from the user (step S91).

In step S91, in a case where the enlargement or reduction operation is received (step S91: Yes), the control device 4 performs the enlargement or reduction of the projection region 11 corresponding to the received enlargement or reduction operation (step S92) and returns to step S91. In step S92, since the fixed end part is not sensed, the control device 4 performs the enlargement or reduction of the projection region 11 without maintaining the position of any end part of the projection region 11.

In step S91, in a case where the enlargement or reduction operation is not received (step S91: No), the control device 4 determines whether or not the first fixed end part is sensed (step S93). In a case where the first fixed end part is not sensed (step S93: No), the control device 4 returns to step S91.

In step S93, in a case where the first fixed end part is sensed (step S93: Yes), the control device 4 determines whether or not the enlargement or reduction operation is received from the user (step S94).

In step S94, in a case where the enlargement or reduction operation is received (step S94: Yes), the control device 4 performs the enlargement or reduction of the projection region 11 in accordance with the received enlargement or reduction operation (step S95) and returns to step S94. In step S95, since one fixed end part is sensed, the control device 4 maintains the position of the one fixed end part of the projection region 11 and performs the enlargement or reduction of the projection region 11.

In step S94, in a case where the enlargement or reduction operation is not received (step S94: No), the control device 4 determines whether or not the second fixed end part is sensed (step S96). In a case where the second fixed end part is not sensed (step S96: No), the control device 4 returns to step S94.

In step S96, in a case where the second fixed end part is sensed (step S96: Yes), the control device 4 determines whether or not the enlargement or reduction operation is received from the user (step S97).

In step S97, in a case where the enlargement or reduction operation is received (step S97: Yes), the control device 4 performs the enlargement or reduction of the projection region 11 in accordance with the received enlargement or reduction operation (step S98) and returns to step S97. In step S98, since two fixed end parts are sensed, the control device 4 maintains the positions of the two fixed end parts of the projection region 11 and performs the enlargement or reduction of the projection region 11.

In step S97, in a case where the enlargement or reduction operation is not received (step S97: No), the control device 4 determines whether or not a confirmation operation of the projection region 11 is received from the user (step S99). In a case where the confirmation operation is not received from the user (step S99: No), the control device 4 returns to step S97.

In step S99, in a case where the confirmation operation is received from the user (step S99: Yes), the control device 4 finishes the series of processing.

As described, in a state where the position of the part of the end part of the projection region 11 irradiated with the projection light by the projection portion 1 is sensed as being the first position (for example, the end part of the screen 6), the projection apparatus 10 of the present embodiment maintains the position of the part of the end part and performs the enlargement or reduction of the projection region 11. Accordingly, the adjustment of the projection region 11 with respect to the projection object can be easily performed.

FIG. 10 is a schematic diagram illustrating an exterior configuration of the projection apparatus 10. FIG. 11 is a schematic cross-sectional view of an optical unit 106 of the projection apparatus 10 illustrated in FIG. 10. FIG. 11 illustrates a cross section in a plane along an optical path of light emitted from a body part 101.

As illustrated in FIG. 10, the projection apparatus 10 comprises the body part 101 and the optical unit 106 that is provided to protrude from the body part 101. In the configuration illustrated in FIG. 10, the control device 4, the control portion 24, and the light modulation portion 21b illustrated in FIG. 1 and FIG. 2 are provided in the body part 101. The projection optical system 22 illustrated in FIG. 1 and FIG. 2 is provided in the optical unit 106.

The optical unit 106 comprises a first member 102 supported by the body part 101 and a second member 103 supported by the first member 102.

The first member 102 and the second member 103 may be an integrated member. The optical unit 106 may be configured to be attachable to and detachable from the body part 101 (in other words, interchangeably configured).

The body part 101 includes a housing 15 (refer to FIG. 11) in which an opening 15a (refer to FIG. 11) for passing light is formed in a part connected to the optical unit 106.

As illustrated in FIG. 10, the light source 21a and a light modulation unit 12 including the light modulation portion 21b (refer to FIG. 2) that generates an image by spatially modulating the light emitted from the light source 21a based on input image data are provided inside the housing 15 of the body part 101.

In the example illustrated in FIG. 2, the light emitted from the light source 21a is incident on the light modulation portion 21b.

As illustrated in FIG. 11, the image formed by the light spatially modulated by the light modulation unit 12 is incident on the optical unit 106 through the opening 15a of the housing 15 and is projected to the screen 6 as a projection target object. Accordingly, an image G1 is visible from an observer.

As illustrated in FIG. 11, the optical unit 106 comprises the first member 102 including a hollow portion 2A connected to the inside of the body part 101, the second member 103 including a hollow portion 3A connected to the hollow portion 2A, a first optical system 121 and a reflective member 122 arranged in the hollow portion 2A, a second optical system 31, a branch member 32, a third optical system 33, a fourth optical system 37, an imaging element 38, and a lens 34 arranged in the hollow portion 3A, a shift mechanism 105, and an imaging direction changing mechanism 104.

The first member 102 is a member having, for example, a rectangular cross-sectional exterior, in which an opening 2a and an opening 2b are formed in surfaces perpendicular to each other. The first member 102 is supported by the body part 101 in a state where the opening 2a is arranged at a position facing the opening 15a of the body part 101. The light emitted from the light modulation portion 21b of the light modulation unit 12 of the body part 101 is incident into the hollow portion 2A of the first member 102 through the opening 15a and the opening 2a.

An incidence direction of the light incident into the hollow portion 2A from the body part 101 will be referred to as a direction X1. A direction opposite to the direction X1 will be referred to as a direction X2. The direction X1 and the direction X2 will be collectively referred to as a direction X. In addition, in FIG. 11, a direction from the front to the back of the page and an opposite direction will be referred to as a direction Z. In the direction Z, the direction from the front to the back of the page will be referred to as a direction Z1, and the direction from the back to the front of the page will be referred to as a direction Z2.

In addition, a direction perpendicular to the direction X and the direction Z will be referred to as a direction Y. In the direction Y, an upward direction in FIG. 11 will be referred to as a direction Y1, and a downward direction in FIG. 11 will be referred to as a direction Y2. In the example in FIG. 11, the projection apparatus 10 is arranged such that the direction Y2 is a vertical direction.

The projection optical system 22 illustrated in FIG. 2 is composed of the first optical system 121, the reflective member 122, the second optical system 31, the branch member 32, the third optical system 33, and the lens 34. An optical axis K of the projection optical system 22 is illustrated in FIG. 11. The first optical system 121, the reflective member 122, the second optical system 31, the branch member 32, the third optical system 33, and the lens 34 are arranged in this order from the light modulation portion 21b side along the optical axis K.

The first optical system 121 includes at least one lens and guides the light that is incident on the first member 102 from the body part 101 and travels in the direction X1, to the reflective member 122.

The reflective member 122 reflects the light incident from the first optical system 121 in the direction Y1. The reflective member 122 is configured with, for example, a mirror. In the first member 102, the opening 2b is formed on the optical path of the light reflected by the reflective member 122, and the reflected light travels to the hollow portion 3A of the second member 103 by passing through the opening 2b.

The second member 103 is a member having an approximately T-shaped cross-sectional exterior, in which an opening 3a is formed at a position facing the opening 2b of the first member 102. The light that has passed through the opening 2b of the first member 102 from the body part 101 is incident into the hollow portion 3A of the second member 103 through the opening 3a. The first member 102 and the second member 103 may have any cross-sectional exterior and are not limited to the above.

The second optical system 31 includes at least one lens and guides the light incident from the first member 102 to the branch member 32.

The branch member 32 guides the light incident from the second optical system 31 to the third optical system 33 by reflecting the light in the direction X2. In addition, the branch member 32 guides subject light that is incident on the lens 34 from the screen 6 side and travels in the direction X1 by passing through the third optical system 33, to the fourth optical system 37 by transmitting the subject light. The branch member 32 is configured with, for example, a half-silvered mirror or a polarizing plate.

The third optical system 33 includes at least one lens and guides the light reflected by the branch member 32 to the lens 34.

The lens 34 is arranged in an end part of the second member 103 on the direction X2 side in the form of closing the opening 3c formed in this end part. The lens 34 projects the light incident from the third optical system 33 to the screen 6.

The fourth optical system 37 includes at least one lens and is arranged adjacent to the branch member 32 on the direction X1 side and guides, to the imaging element 38, the subject light that is transmitted through the branch member 32 and travels in the direction X1. An optical axis of the fourth optical system 37 approximately matches optical axes of the lens 34 and the third optical system 33. The fourth optical system 37 may include a lens having a variable focal length.

The imaging element 38 is a CCD image sensor, a MOS image sensor, or the like. The imaging element 38 images the screen 6 through the lens 34, the third optical system 33, the branch member 32, and the fourth optical system 37. The lens 34, the third optical system 33, and the branch member 32 constitute a part of the projection optical system. The imaging portion 5 illustrated in FIG. 1 may be configured with the imaging element 38 or may be configured with other imaging elements.

The imaging direction changing mechanism 104 is a rotation mechanism that rotatably connects the second member 103 to the first member 102. By the imaging direction changing mechanism 104, the second member 103 is configured to be rotatable about a rotation axis (specifically, the optical axis K) that extends in the direction Y. The imaging direction changing mechanism 104 is not limited to an arrangement position illustrated in FIG. 11 as long as the imaging direction changing mechanism 104 can rotate the optical system. In addition, the number of rotation mechanisms is not limited to one, and a plurality of rotation mechanisms may be provided.

The shift mechanism 105 is a mechanism for moving the optical axis K of the projection optical system (in other words, the optical unit 106) in a direction (direction Y in FIG. 11) perpendicular to the optical axis K. Specifically, the shift mechanism 105 is configured to be capable of changing a position of the first member 102 in the direction Y with respect to the body part 101. The shift mechanism 105 may manually move the first member 102 or electrically move the first member 102.

FIG. 11 illustrates a state where the first member 102 is moved as far as possible to the direction Y1 side by the shift mechanism 105. By moving the first member 102 in the direction Y2 by the shift mechanism 105 from the state illustrated in FIG. 11, a relative position between a center of the image (in other words, a center of a display surface) formed by the light modulation portion 21b and the optical axis K changes, and the image G1 projected to the screen 6 can be shifted (translated) in the direction Y2.

The shift mechanism 105 may be a mechanism that moves the light modulation portion 21b in the direction Y instead of moving the optical unit 106 in the direction Y. Even in this case, the image G1 projected to the screen 6 can be shifted in the direction Y2.

(Modification Example of Present Embodiment)

While one corner of the projection region 11 is illustratively described as the part of the end part of the projection region 11, the part of the end part of the projection region 11 may be a side or the like of the projection region 11.

Figure 12:
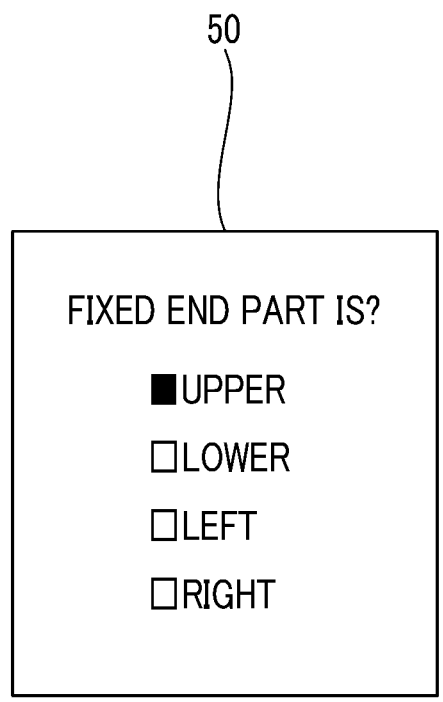
FIG. 12 is a diagram illustrating a modification example of the selection screen of the fixed end parts of the projection region 11.

FIG. 12 is a diagram illustrating a modification example of the selection screen of the fixed end part of the projection region 11. For example, the control device 4 may display the selection screen 50 illustrated in FIG. 12 to the user. The selection screen 50 illustrated in FIG. 12 shows four sides of upper, lower, left, and right sides as candidates of the fixed end part.

For example, the user causes the control device 4 to sense the upper side as the first fixed end part by selecting the upper side in the selection screen 50 in a state where the upper side of the projection region 11 is matched to an upper side of the screen. Next, in a case where the user performs the enlargement or reduction operation, maintaining of a position of the upper side and the enlargement or reduction of the projection region 11 are performed. Then, in the same manner as in a case of setting the corner of the projection region 11 as the fixed end part, the adjustment of the projection region 11 with respect to the screen 6 can be performed by performing the enlargement or reduction of the projection region 11 while setting the side of the projection region 11 as the fixed end part.

The part of the end part of the projection region 11 may be two adjacent corners of the projection region 11. In this case, the user first matches the two adjacent corners (as an example, the upper left and the upper right corners) of the projection region 11 to the end part of the screen 6 and then, causes the control device 4 to sense the two corners as the fixed end part. In this case, for example, the control device 4 performs processing of determining whether or not two fixed end parts are sensed from the user instead of steps S93 to S96 illustrated in FIG. 9.

While a sensing method based on a user operation is described as a method of sensing the fixed end part by the control device 4, the present invention is not limited to such a method. For example, the control device 4 may specify an end part that matches the end part of the screen 6 in the end part of the projection region 11 based on the image obtained by imaging the screen 6 using the imaging portion 5, and sense the specified end part as the fixed end part.

Alternatively, the control device 4 may detect an instruction (user instruction) from the user by a gesture using fingers of the user based on the image obtained by imaging using the imaging portion 5, and sense the fixed end part based on a detection result.

For example, in a case where the control device 4 detects the fingers of the user having an L-shape in the obtained image, the control device 4 senses the lower left corner of the projection region 11 as the fixed end part. In addition, in a case where the control device 4 detects the fingers of the user having an L-shape inverted in an up-down direction in the obtained image, the control device 4 senses the upper left corner of the projection region 11 as the fixed end part. In addition, in a case where the control device 4 detects the fingers of the user having an L-shape inverted in a left-right direction in the obtained image, the control device 4 senses the lower right corner of the projection region 11 as the fixed end part. In addition, in a case where the control device 4 detects the fingers of the user having an L-shape inverted in the up-down direction and the left-right direction in the obtained image, the control device 4 senses the upper right corner of the projection region 11 as the fixed end part.

Alternatively, in a case where the control device 4 detects the fingers of the user pointing to a specific direction in the obtained image, the control device 4 may sense an end part of the projection region 11 in the specific direction as the fixed end part.

In addition, instead of optical enlargement or reduction by changing the projection optical system 22 or in addition to the optical enlargement or reduction, the control device 4 may perform electronic enlargement or reduction by controlling the light modulation portion 21b. The electronic enlargement or reduction by controlling the light modulation portion 21b constitutes enlargement or reduction based on a control of changing the projection image of the projection portion 1.

In addition, in a case where the aspect ratio of the projection region 11 before the adjustment is the same as the aspect ratio of the screen 6, the electronic control (for example, steps S97 to S99 in FIG. 9) of the aspect ratio of the projection region 11 is not necessary.

In addition, while a case of adjusting the projection region 11 such that the periphery of the projection region 11 matches the periphery of the screen 6 is described, the adjustment of the projection region 11 can be performed in any region in the screen 6.

A configuration in which the user adjusts the position of the projection region 11 is described. However, in a case where the projection apparatus 10 comprises the adjustment portion, this adjustment portion may be configured to align the position of the part (for example, the corner) of the end part of the projection region 11 to the specific position of the screen 6 (for example, the corner of the screen). In such a configuration, the adjustment portion may perform the registration in accordance with the user operation or may perform the registration based on, for example, imaging data obtained by the imaging portion 5 without the user operation.

At least the following matters are disclosed in the present specification.

(1) A projection apparatus including a projection portion, and a processor, in which the processor is configured to, in a state where a position of a part of an end part of a projection region irradiated with projection light by the projection portion is sensed as being a first position, maintain the position of the part of the end part and execute a control of performing enlargement or reduction of the projection region.

(2) The projection apparatus according to (1), in which the processor is configured to maintain the position of the part of the end part and execute the control of performing the enlargement or reduction of the projection region in accordance with a user instruction.

(3) The projection apparatus according to (1) or (2), further comprising an imaging portion, in which the processor is configured to, in a state where the position of the part of the end part of the projection region irradiated with the projection light by the projection portion is sensed as being the first position by the imaging portion, maintain the position of the part of the end part and execute the control of performing the enlargement or reduction of the projection region.

(4) The projection apparatus according to any one of (1) to (3), further comprising an adjustment portion, in which the adjustment portion aligns the position of the part of the end part of the projection region irradiated with the projection light by the projection portion to a specific position of a projection surface.

(5) The projection apparatus according to any one of (1) to (4), in which the first position is a position at which the position of the part of the end part of the projection region irradiated with the projection light by the projection portion matches a specific position of a projection surface.

(6) The projection apparatus according to any one of (1) to (5), in which the processor is configured to maintain the position of the part of the end part and execute the control of performing the enlargement or reduction by performing movement of the projection region for matching the position of the part of the end part changed by the enlargement or reduction based on a center of the projection region to the first position.

(7) The projection apparatus according to any one of (1) to (6), in which the processor is configured to execute the control of performing the enlargement or reduction based on at least any one of a control of changing an optical system of the projection portion or a control of changing a projection image of the projection portion.

(8) The projection apparatus according to any one of (1) to (7), in which the processor is configured to sense the position of the part of the end part as being the first position based on a user operation.

(9) The projection apparatus according to any one of (1) to (8), in which the projection region is rectangular, and the part of the end part is one corner of the projection region.

(10) The projection apparatus according to (9), in which the processor is configured to, in a case where a position of a corner adjacent to the one corner among corners of the projection region is sensed as being a second position in a state where an aspect ratio of the projection region is maintained and the enlargement or reduction is performed, maintain each position of the one corner and the adjacent corner and execute the control of performing the enlargement or reduction of the projection region.

(11) The projection apparatus according to any one of (1) to (10), in which the projection region is rectangular, and the part of the end part is two adjacent corners of the projection region.

(12) The projection apparatus according to (11), in which the processor is configured to, in a state where positions of the two corners are sensed as being the first position and a second position, respectively, maintain each position of the two corners and execute the control of performing the enlargement or reduction of the projection region.

(13) A projection method by a projection apparatus including a projection portion, the projection method including, in a state where a position of a part of an end part of a projection region irradiated with projection light by the projection portion is sensed as being a first position, maintaining the position of the part of the end part and performing enlargement or reduction of the projection region.

(14) The projection method according to (13), in which the position of the part of the end part is maintained and the enlargement or reduction of the projection region is performed in accordance with a user instruction.

(15) The projection method according to (13) or (14), in which the projection apparatus further includes an imaging portion, and in a state where the position of the part of the end part of the projection region irradiated with the projection light by the projection portion is sensed as being the first position by the imaging portion, the position of the part of the end part is maintained and the enlargement or reduction of the projection region is performed.

(16) The projection method according to any one of (13) to (15), in which the projection apparatus further includes an adjustment portion, and the adjustment portion aligns the position of the part of the end part of the projection region irradiated with the projection light by the projection portion to a specific position of a projection surface.

(17) The projection method according to any one of (13) to (16), in which the first position is a position at which the position of the part of the end part of the projection region irradiated with the projection light by the projection portion matches a specific position of a projection surface.

(18) The projection method according to any one of (13) to (17), in which the position of the part of the end part is maintained and the enlargement or reduction is performed by performing movement of the projection region for matching the position of the part of the end part changed by the enlargement or reduction based on a center of the projection region to the first position.

(19) The projection method according to any one of (13) to (18), in which the enlargement or reduction is performed based on at least any one of a control of changing an optical system of the projection portion or a control of changing a projection image of the projection portion.

(20) The projection method according to any one of (13) to (19), in which the position of the part of the end part is sensed as being the first position based on a user operation.

(21) The projection method according to any one of (13) to (20), in which the projection region is rectangular, and the part of the end part is one corner of the projection region.

(22) The projection method according to (21), in which in a case where a position of a corner adjacent to the one corner among corners of the projection region is sensed as being a second position in a state where an aspect ratio of the projection region is maintained and the enlargement or reduction is performed, each position of the one corner and the adjacent corner is maintained and the enlargement or reduction of the projection region is performed.

(23) The projection method according to any one of (13) to (22), in which the projection region is rectangular, and the part of the end part is two adjacent corners of the projection region.

(24) The projection method according to (23), in which in a state where positions of the two corners are sensed as being the first position and a second position, respectively, each position of the two corners is maintained and the enlargement or reduction of the projection region is performed.

(25) A control program of a projection apparatus including a projection portion, the control program causing a computer to execute a process including, in a state where a position of a part of an end part of a projection region irradiated with projection light by the projection portion is sensed as being a first position, maintaining the position of the part of the end part and performing enlargement or reduction of the projection region.

While various embodiments are described above with reference to the drawings, the present invention is not limited to such examples. It is apparent that those skilled in the art may perceive various modification examples or correction examples within the scope disclosed in the claims, and those examples are also understood as falling in the technical scope of the present invention. In addition, any combination of various constituents in the embodiment may be used without departing from the gist of the invention.

The present application is based on Japanese Patent Application (JP2019-237977) filed on Dec. 27, 2019, the content of which is incorporated in the present application by reference.

EXPLANATION OF REFERENCES

1: projection portion
G1: image
2: operation reception portion
2A, 3A: hollow portion
2a, 2b, 3a, 3c, 15a: opening
4: control device
4a: storage medium
5: imaging portion
6: screen
10: projection apparatus
11: projection region
12: light modulation unit
15: housing
21: display portion
21a: light source
21b: light modulation portion
22: projection optical system
24: control portion
31: second optical system
32: branch member
33: third optical system
34: lens
37: fourth optical system
38: imaging element
50: selection screen
101: body part
102: first member
103: second member
104: imaging direction changing mechanism
105: shift mechanism
106: optical unit
121: first optical system
122: reflective member

What is claimed is:

1. A projection apparatus comprising:
a projection portion; and
a processor,
wherein the processor is configured to:
cause a user to select, among end parts of a projection region irradiated with projection light by the projection portion, a part of an end part of the projection region; and
in a state where a position of the part of the end part is sensed as being a first position, maintain the position of the part of the end part and execute, by a control of changing an optical system of the projection portion, a control of performing enlargement or reduction of the projection region.

2. The projection apparatus according to claim 1,
wherein the processor is configured to maintain the position of the part of the end part and execute the control of performing the enlargement or reduction of the projection region in accordance with an instruction of the user.

3. The projection apparatus according to claim 1, further comprising:
an imaging portion,
wherein the processor is configured to, in a state where the position of the part of the end part of the projection region irradiated with the projection light by the projection portion is sensed as being the first position by the imaging portion, maintain the position of the part of the end part and execute the control of performing the enlargement or reduction of the projection region.

4. The projection apparatus according to claim 1, further comprising:
an adjustment portion,
wherein the adjustment portion aligns the position of the part of the end part of the projection region irradiated with the projection light by the projection portion to a specific position of a projection surface.

5. The projection apparatus according to claim 1,
wherein the processor is configured to execute the control of performing the enlargement or reduction by the control of changing an optical system of the projection portion and a control of changing a projection image by the projection portion.

6. The projection apparatus according to claim 1,
wherein the processor is configured to sense the position of the part of the end part as being the first position based on an operation of the user.

7. The projection apparatus according to claim 1, wherein the part of the end part of the projection region that is selected by the user is a corner of the projection region.

8. A projection method by a projection apparatus including a projection portion, the projection method comprising:
   causing a user to select, among end parts of a projection region irradiated with projection light by the projection portion, a part of an end part of the projection region; and
   in a state where a position of the part of the end part is sensed as being a first position, maintaining the position of the part of the end part and performing, by a control of changing an optical system of the projection portion, enlargement or reduction of the projection region.

9. A non-transitory computer readable medium storing a control program of a projection apparatus including a projection portion, the control program causing a computer to execute a process comprising:
   causing a user to select, among end parts of a projection region irradiated with projection light by the projection portion, a part of an end part of the projection region; and
   in a state where a position of the part of the end part is sensed as being a first position, maintaining the position of the part of the end part and performing, by a control of changing an optical system of the projection portion, enlargement or reduction of the projection region.

10. A projection apparatus comprising:
   a projection portion; and
   a processor,
   wherein the processor is configured to:
   in a state where a position of a part of an end part of a projection region irradiated with projection light by the projection portion is sensed as being a first position, maintain the position of the part of the end part and execute a control of performing enlargement or reduction of the projection region; and
   maintain the position of the part of the end part and execute the control of performing the enlargement or reduction by performing movement of the projection region for matching the position of the part of the end part changed by the enlargement or reduction based on a center of the projection region to the first position.

11. A projection apparatus comprising:
   a projection portion; and
   a processor,
   wherein the processor is configured to:
   in a state where a position of one corner of a rectangular projection region irradiated with projection light by the projection portion is sensed as being a first position, maintain the position of the one corner and execute a control of performing enlargement or reduction of the projection region; and
   in a case where a position of a corner adjacent to the one corner among corners of the projection region is sensed as being a second position in a state where an aspect ratio of the projection region is maintained and the enlargement or reduction is performed, maintain each position of the one corner and the adjacent corner and execute the control of performing the enlargement or reduction of the projection region.

12. A projection method by a projection apparatus including a projection portion, the projection method comprising:
   in a state where a position of a part of an end part of a projection region irradiated with projection light by the projection portion is sensed as being a first position, maintaining the position of the part of the end part and performing enlargement or reduction of the projection region,
   wherein the position of the part of the end part is maintained and the enlargement or reduction is performed by performing movement of the projection region for matching the position of the part of the end part changed by the enlargement or reduction based on a center of the projection region to the first position.

13. A projection method by a projection apparatus including a projection portion, the projection method comprising:
   in a state where a position of one corner of a rectangular projection region irradiated with projection light by the projection portion is sensed as being a first position, maintaining the position of the one corner and performing enlargement or reduction of the projection region,
   wherein in a case where a position of a corner adjacent to the one corner among corners of the projection region is sensed as being a second position in a state where an aspect ratio of the projection region is maintained and the enlargement or reduction is performed, each position of the one corner and the adjacent corner is maintained and the enlargement or reduction of the projection region is performed.

14. A non-transitory computer readable medium storing a control program of a projection apparatus including a projection portion, the control program causing a computer to execute a process comprising:
   in a state where a position of a part of an end part of a projection region irradiated with projection light by the projection portion is sensed as being a first position, maintaining the position of the part of the end part and performing enlargement or reduction of the projection region,
   wherein the position of the part of the end part is maintained and the enlargement or reduction is performed by performing movement of the projection region for matching the position of the part of the end part changed by the enlargement or reduction based on a center of the projection region to the first position.

15. A non-transitory computer readable medium storing a control program of a projection apparatus including a projection portion, the control program causing a computer to execute a process comprising:
   in a state where a position of one corner of a rectangular projection region irradiated with projection light by the projection portion is sensed as being a first position, maintaining the position of the one corner and performing enlargement or reduction of the projection region,
   wherein in a case where a position of a corner adjacent to the one corner among corners of the projection region is sensed as being a second position in a state where an aspect ratio of the projection region is maintained and the enlargement or reduction is performed, each position of the one corner and the adjacent corner is maintained and the enlargement or reduction of the projection region is performed.

* * * * *